United States Patent [19]

Wakamiya

[11] Patent Number: 4,653,887
[45] Date of Patent: Mar. 31, 1987

[54] CHANGEABLE MAGNIFICATION INVERTED GALILEAN FINDER

[75] Inventor: Koichi Wakamiya, Tokyo, Japan

[73] Assignee: Nippon Kogaku K. K., Tokyo, Japan

[21] Appl. No.: 698,530

[22] Filed: Feb. 5, 1985

[30] Foreign Application Priority Data

Feb. 9, 1984 [JP] Japan .................................. 59-22565
Feb. 9, 1984 [JP] Japan .................................. 59-22566

[51] Int. Cl.$^4$ ............................................ G03B 13/02
[52] U.S. Cl. ............................ 354/219; 350/410; 350/422
[58] Field of Search ............ 354/219, 222; 350/410, 350/422

[56] References Cited

U.S. PATENT DOCUMENTS

2,755,701  3/1956  Altman ......................... 354/222 X
4,104,663  6/1978  Yamazaki et al. ................... 354/197

Primary Examiner—L. T. Hix
Assistant Examiner—Brian W. Brown
Attorney, Agent, or Firm—Shapiro and Shapiro

[57] ABSTRACT

A changeable magnification inverted Galilean finder includes, in succession from the object side, an objective lens group having a negative refractive power, and an eyepiece of positive refractive power disposed at a predetermined distance from the objective lens group. The objective lens group has a first objective lens for low magnification and a second objective lens for high magnification. The first objective lens for low magnification has a first negative lens component having a predetermined negative refractive power. The second objective lens for high magnification has a negative refractive power smaller than the refractive power of the first objective lens for low magnification, and has a second negative lens component and a positive lens component added on the object side of the second negative lens component. A low magnification state in which the objective lens for low magnification is disposed on the same optic axis as that of the eyepiece and a high magnification state in which the objective lens for high magnification is disposed on the same optic axis as that of the eyepiece are selectively constructed.

11 Claims, 17 Drawing Figures

CHANGEABLE MAGNIFICATION INVERTED GALILEAN FINDER

BACKGROUND OF THE INVENTION

1. Field of the Invention

This invention relates to a finder used in a camera or the like, and particularly to a changeable magnification inverted Galilean finder.

2. Description of the Prior Art

In a focal length change-over type camera, it is desired that with a change of the angle of view of the photo-taking lens, a photographing range display be changed in the finder. In a camera containing an inverted Galilean finder therein, changing the size of the field frame and changing the magnification of the finder are two known techniques for changing the photographing range display. For changing the size of the field frame, there is known, for example, a method of providing an illuminating window type bright frame and moving the bright frame to thereby vary the apparent size of the frame, but this method has a disadvantage that if the angle of view becomes narrow, the apparent field of the field frame becomes small and it becomes difficult to look through the field frame. In contrast, in a system for changing the magnification of the finder, it is possible to make the apparent field of the photographing range constant so that a finder observation more approximate to the actual photographing picture plane becomes possible. This system is thus superior to changing the size of the field frame.

As the method of changing the magnification, the focal length of a negative lens as an objective lens may be varied and an afocal state may be kept between the negative lens and an eyepiece of positive refractive power. More specifically, there is known a method in which, as shown in FIGS. 1A and 1B of the accompanying drawings, a negative lens L2 is replaced with a negative lens L1 having a different focal length, or a method in which, as shown in FIGS. 2A and 2B of the accompanying drawings, a negative lens L4 is removed from the optical path and a negative lens L1 is moved toward the observation side to thereby effect the change of the magnification to a high magnification. FIGS. 1A and 2A show the low magnification state, i.e., the wide angle side, and FIGS. 1B and 2B show the high magnification state, i.e., the telephoto side. These methods are methods of changing the magnification by positioning a negative lens onto or of the optic axis, but these methods have a disadvantage that the amounts of displacement S1 and S2 of the negative lens in the direction of the optic axis during a change between high magnification and great, so that magnification are great and it is difficult to provide sufficient space on the eyepiece side and therefore, the construction of the finder is liable to become bulky. In a finder for a camera, it is desirable to set the full length of the finder to a value equal to or shorter than the thickness of the body of the camera and in practice, the full length of the finder is desirably of the order of 30–40 mm. Particularly, in the latest finders, it is desired that numerous types of information such as the field frame, the range finding frame, the photographing distance display and the propriety of exposure amount be displayed at the same time and therefore, it has become necessary to add space-consuming members such as an Albada system and a half-mirror for the illuminating window type bright frame. However, where the amount of displacement of the negative lens for magnification change on the optic axis is great, the space in which optical members for various information displays are disposed becomes smaller and thus, design limitations have become more severe and sufficient information displays have been difficult.

SUMMARY OF THE INVENTION

It is an object of the present invention to eliminate the above-noted disadvantages peculiar to the prior art and to provide a changeable magnification inverted Galilean finder in which the amount of decrease in the eyepiece side space resulting from the magnification change of the inverted Galilean finder is small and accordingly advantageous compact finders have become possible while providing large effective space in the finder, thereby enabling numerous information displays to be accomplished in the field of view of the finder.

To achieve such an object of the present invention, in an inverted Galilean finder having an objective lens having a negative refractive power and an eyepiece having a positive refractive power disposed on the emergent light side of the objective lens at a predetermined distance therefrom, change-over is effected between a low magnification state using an objective lens for low magnification having a predetermined negative refractive power and a high magnification state using an objective lens for high magnification having a negative refractive power considerably weaker than said predetermined negative refractive power. The objective lens for high magnification is constituted, in succession from the object side, by a positive lens and a negative lens disposed at a predetermined distance therefrom. In the high magnification state, the light beam from an object to be photographed is first converged by the positive lens in the objective lens for high magnification, and then is diverged by the negative lens, whereby the principal point for the objective lens for high magnification having a negative refractive power lies on the eyepiece side and thus, even in the high magnification state, a space larger than in the prior art is secured between the objective lens and the eyepiece.

BRIEF DESCRIPTION OF THE DRAWINGS

FIG. 5 showing the high magnification state in the conventional system, and FIGS. 6 and 7 showing the low magnification state and the high magnification state, respectively, according to the present invention.

DESCRIPTION OF THE PREFERRED EMBODIMENTS

Figure 3A:
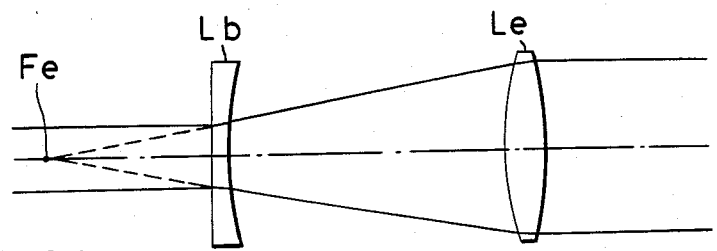
FIGS. 3A, 3B, 4A and 4B are basic construction views showing the operation of changing the magnification of the inverted Galilean finder according to the present invention, FIGS. 3A and 4A showing the low magnification state, and FIGS. 3B and 4B showing the high magnification state.
Figure 3B:
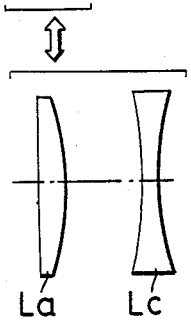
Figure 3B:
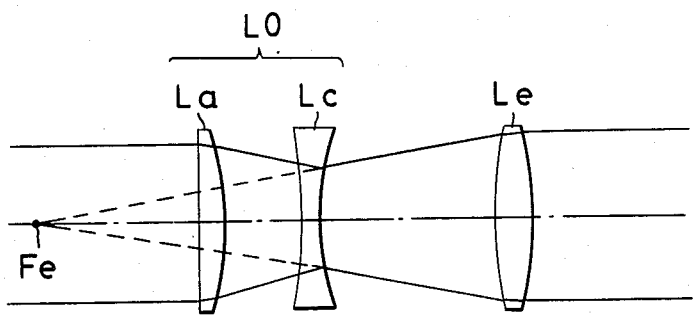

In a changeable magnification inverted Galilean finder according to the present invention, as shown in FIGS. 3A and 3B, a negative lens Lb as an objective lens in a low magnification state and an objective lens Lo for high magnification having a positive lens La and a negative lens Lc in succession from the object side are interchangeably provided, and by interchanging the negative lens Lb with the objective lens Lo for high magnification, a high magnification state is achieved. More particularly, a lens group Lb having a negative refractive power as an objective lens and a lens group Le having a positive refractive power as an eyepiece disposed at a predetermined distance from the lens group Lb are provided in succession from the object side, and further, an objective lens Lo for high magnification interchangeable with the negative lens group Lb as an objective lens for low magnification is constituted by a positive lens La and a negative lens Lc in succession from the object side, and by interchanging the negative lens Lb with the objective lens for high magnification, the change to a high magnification state is made possible.

Figure 4A:
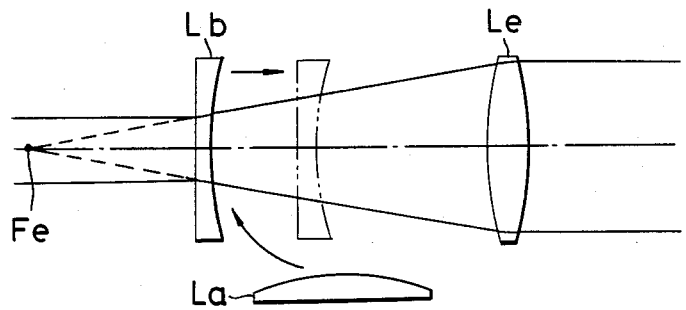
Figure 4B:
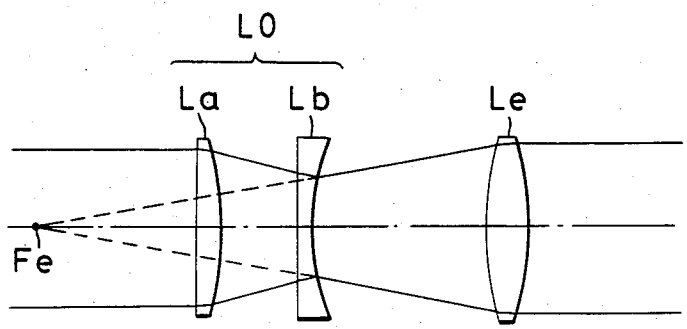

In the construction of the present invention shown in FIGS. 3A and 3B, it is possible that the negative lens Lb as the objective lens for low magnification and the negative lens Lc in the objective lens for high magnification are provided by the same lens. In such case, the negative lens Lb as the objective lens for low magnification can be used also as the negative lens Lc of the objective lens for high magnification. That is, as shown in FIG. 4A (a low magnification state) and FIG. 4B (a high magnification state), during the change-over from the low magnification state to the high magnification state, the negative lens Lb as the objective lens for low magnification is moved toward the eyepiece Le and the positive lens La is inserted into the object side of this negative lens Lb. Where the objective lens for low magnification is constituted by a plurality of negative lenses, the design may be such that only some of the negative lenses are moved toward the eyepiece. In other words, the lens group Lb having a negative refractive power as the objective lens and the lens group Le having a positive refractive power as the eyepiece disposed at a predetermined distance from the lens group Lb are provided in succession from the object side, and by moving at least one negative lens in the negative lens group Lb toward the eyepiece and inserting the positive lens La onto the optic axis on the object side of the moved negative lens Lb, the change to a higher magnification is accomplished.

The geometro-optical basic construction of the changeable magnification inverted Galilean finder according to the present invention will hereinafter be described in detail.

Figure 5:
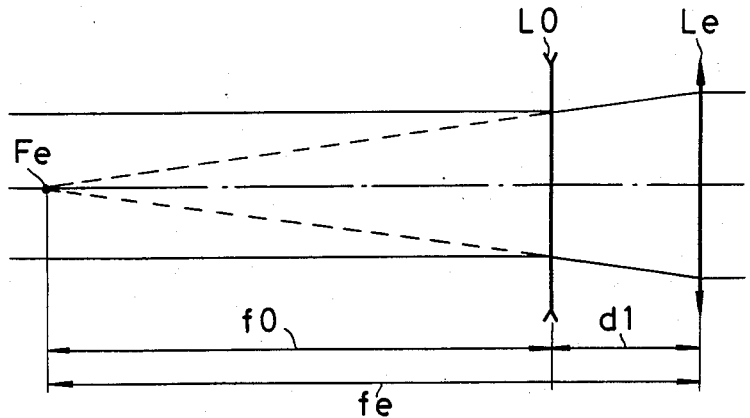
FIGS. 5, 6 and 7 illustrate the geometrooptical basic construction.
Figure 6:
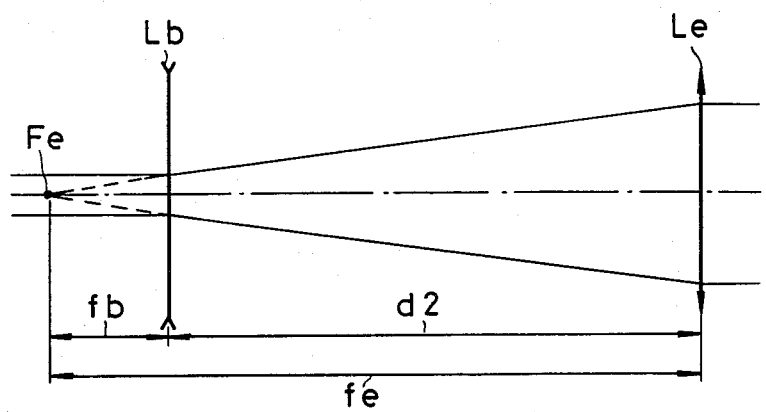
Figure 7:
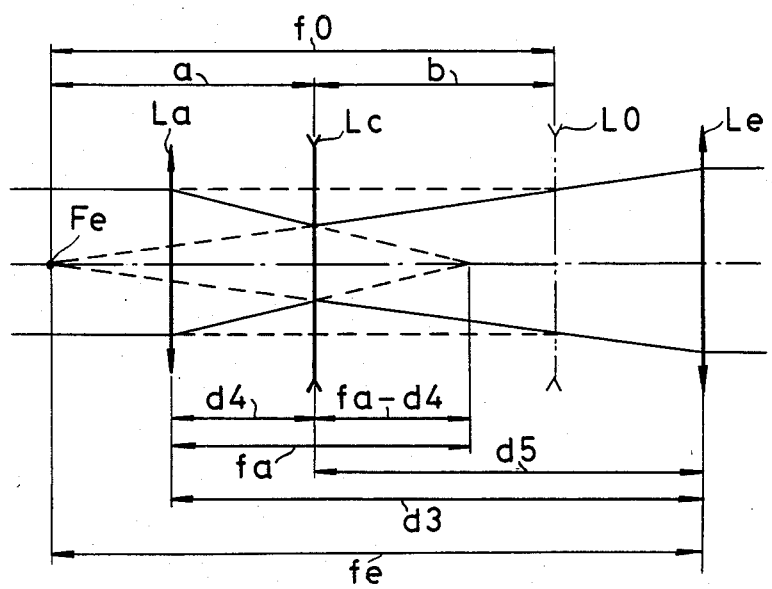

FIG. 5 is a geometro-optical construction view showing the popular high magnification state according to the prior art, FIG. 6 is a geometrooptical construction view showing the low magnification state of the inverted Galilean finder according to the present invention, and FIG. 7 is a geometrooptical construction view showing the high magnification state of the inverted Galilean finder according to the present invention. In the changeable magnification inverted Galilean finder of the present invention, it is to be understood that the state of FIG. 6 is the low magnification state and the state of FIG. 7 is the high magnification state. In the high magnification state in the present invention, the objective lens Lo for high magnification is formed by a composite system of the positive lens La and the negative lens Lc, and it has substantially the same function as the objective lens Lo in the popular high magnification state shown in FIG. 5.

Assuming that the finder magnification in the popular high magnification state (i.e., the telephoto side) shown in FIG. 5 is $\beta1$, the focal length of the objective lens Lo is fo, the focal length of the eyepiece is fe, the distance between the principal points of the objective lens Lo and the eyepiece Le is d1 and the finder is a completely afocal system, then the following relations are established:

$$\beta1 = -fo/fe \tag{1}$$

$$d1 = fe + fo \tag{2}$$

Next, assuming that the finder magnification on the low magnification side (the wide angle side in FIG. 6 is $\beta2$, the focal length of the negative lens Lb as the objective lens is fb, the focal length of the eyepiece Le is fe, which is the same as the focal length on the high magnification side, and the distance between the principal points of the objective lens Lb and the eyepiece Le is d2, then the following relations are established:

$$\beta2 = -fb/fe \tag{3}$$

where $\beta1 > \beta2$ $$d2 = fe + fb \tag{4}$$

If equations (3) and (4) are solved, $$fb = -\frac{\beta2 \cdot d2}{1 - \beta2} \tag{5}$$

$$fe = \frac{d2}{1 - \beta2}. \tag{6}$$

Figure 1A:
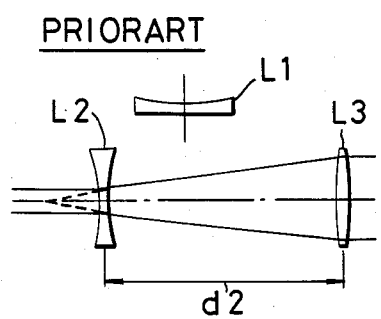
FIGS. 1A, 1B, 2A and 2B are optical path views showing the magnification changing systems of the inverted Galilean finder according to the prior art, FIGS. 1A and 2A showing a low magnification state, and FIGS. 1B and 2B showing a high magnification state.
Figure 1B:
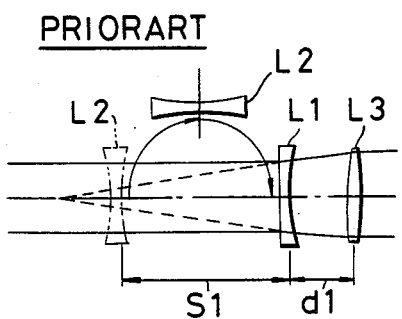
Figure 2A:
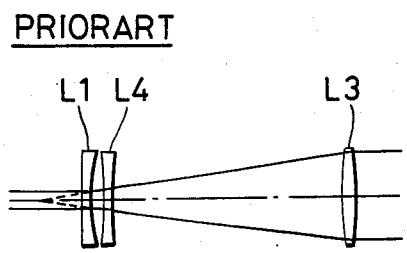
Figure 2B:
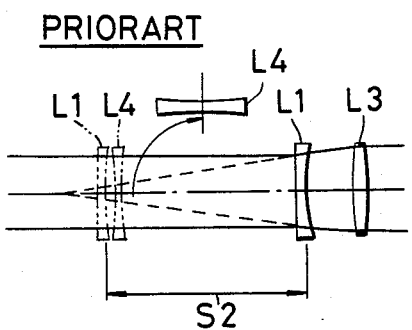

Comparing the present invention with the prior art shown in FIGS. 1A and 1B, it can be considered that the negative lens L1 as the objective lens in the high magnification state (FIG. 1B) has the focal length fo, the negative lens L2 as the objective lens in the low magnification state (FIG. 1A) has the focal length fb and the positive lens L3 as the eyepiece has the focal length fe. The amount of displacement of the negative lens L2 and the negative lens L1 for magnification change is S1.

In such an example of the prior art, when the spacing between the objective lens and the eyepiece in the high magnification state and the spacing between the objective lens and the eyepiece in the low magnification state are d1 and d2, respectively, d2 > d1 and therefore, the full length of the finder is prescribed by the value of d2 and usually, the dimension thereof is a value approximate to the thickness of the camera body. By substituting equations (1) and (6) into equation (2), the value of d1 is found as $$d1 = d2 \times \frac{1 - \beta1}{1 - \beta2}. \tag{7}$$

By substituting equation (6) into equation (1), the value of the focal length fo of the objective lens Lo for high magnification is found as $$fo = \frac{-\beta 1 \cdot d2}{1 - \beta 2}. \quad (8)$$

Generally, the amount of displacement of the negative lens Lo as the objective lens for high magnification and the negative lens Lb as the objective lens for low magnification in the direction of the optic axis may be roughly shown as the amount of d2−d1 if the position of the eyepiece fe is constant. From equation (7), $$d2 - d1 = d2 \times \frac{\beta 1 - \beta 2}{1 - \beta 2}. \quad (9)$$

If d2, $\beta 1$ and $\beta 2$ are given as the conditions of the finder, the lens arrangements in the low magnification state and the high magnification state are determined in accordance with equations (5), (6), (7), (8) and (9).

Accordingly, an amount of distance of the order of that defined by equation (9) becomes necessary as the amount of displacement S1 of the negative lens according to the conventional systems of FIGS. 1A, 1B, 2A and 2B. In the prior art of FIGS. 1A and 1B, the amount of displacement S1 from the negative lens L2 to the negative lens L1 is S1=d2−d1, and in the prior art of FIGS. 2A and 2B, the amount of displacement S2 of the negative lens L1 is S2≠d2−d1 when the lenses L1 and L4 are near each other.

Equation (9) may be deformed into $$d2 - d1 = d2 \times \frac{(\beta 1/\beta 2) - 1}{(1/\beta 2) - 1} \quad (9')$$

and if the magnification ratio $\beta 1/\beta 2$ of the finder is a constant value, as the value of $\beta 2$ is made smaller, the value of d2−d1 becomes smaller, because $(\beta 1/\beta 2) > 1$ and $0 < \beta 2 < 1$.

Conversely, if the value of d2−d1 is limited to less than a certain value, the upper limit of $\beta 2$ will be prescribed, and this is the reason why only finders having a small value of $\beta 2$ and accordingly a small apparent field have heretofore been provided. Equation (9') means that if the value of the magnification ratio $\beta 1/\beta 2$ of the finder becomes greater, the amount of displacement d2−d1 of the negative lens is increased, and if the magnification ratio $\beta 1/\beta 2$ of the finder is made greater by the magnification changing system of the prior art, the requirement for making the value of $\beta 2$ even smaller is increased and the apparent field unavoidably becomes smaller.

The present invention can secure a large effective space within the finder while keeping the same magnification $\beta 2$ on the high magnification side, not by the conventional arrangement of FIG. 5 but by the arrangement of FIG. 7.

In the high magnification state of FIG. 7, it is to be understood that the focal lengths of the positive lens La and the negative lens Lc constituting the objective lens are fa and fc, respectively, and these positive lens La and negative lens Lc are disposed with the inter-principal point spacing d4. It is also to be understood that the composite focal length of the objective lens is fo and the interprincipal point spacing between the positive lens La and the eyepiece Le is d3. To change over from the low magnification state of FIG. 6 to the high magnification state of FIG. 7, the negative lens Lb as the objective lens for low magnification is removed from the optical path and instead, the objective lens Lo having the positive lens La and the negative lens Lc disposed with the inter-principal point spacing d4 is inserted into the optical path. Comparing the high magnification state of FIG. 5 in the prior art with the high magnification state of FIG. 7 by the present invention, it is clear that the space d5 at the eyepiece Le side of the negative lens Lc for changing the high magnification state into geometrically the same high magnification condition is substantially greater than d1.

In the construction of the high magnification state by the present invention shown in FIG. 7, when the distance between the object side focus Fe of the eyepiece Le and the negative lens Lc is a, $$\frac{fa}{fa - d4} = \frac{-fo}{a}.$$

This may be rearranged into $$fa = \frac{fo \cdot d4}{a + fo}. \quad (10)$$

Also, from the imaging relation with respect to the negative lens Lc, $$\frac{1}{-(fa - d4)} + \frac{1}{(-a)} = \frac{1}{fc}.$$

If the above equation is rearranged with respect to fc and equation (10) is substituted thereinto, fc will be found as $$fc = \frac{a \cdot d4}{a + fo - d4}. \quad (11)$$

And $$d3 = fe - a + d4 \quad (12).$$

The difference between the amount of displacement of the negative lens according to the prior art and the amount of displacement of the negative lens according to the present invention, i.e., the distance b between the position of the negative lens Lo in the high magnification state by the conventional magnification changing system shown in FIG. 5 and the position of the negative lens Lo in the high magnification state by the magnification changing system of the present invention shown in FIG. 7, is expressed as $$b = -fo - a \quad (13).$$

Solving a from equations (11) and (12), since $a > 0$, $$a = \frac{(fe - d3) + \sqrt{(fe - d3)^2 + 4fc(fo + fe - d3)}}{2}. \quad (14)$$

When the spacing d3 between the positive lens La added in the high magnification state and the eyepiece is given by the above equation in addition to the spacing d2 between the objective lens Lb and the eyepiece Le in the low magnification state, the magnification $\beta 1$ in the high magnification state and the magnification $\beta 2$ in the low magnification state, fb, fe, d1, fo and d2−d1 are successively determined by equations (5) to (9), and a is determined by equation (14) for any negative value fc. Further, fa is determined by equation (10) and the value of b is determined by equation (13). The amount of decrease $\Delta$ in the space on the eyepiece side in the finder by the interchange of the objective lens for magnification change is found as $$\Delta = a - 1|fb|.$$

By substituting equation (14) into equation (12), the on-axis spacing d4 between the positive lens La and the negative lens Lc is found as $$d4 = \frac{-(fe - d3) + \sqrt{(fe - d3)^2 + 4fc(fo + fe - d3)}}{2} \quad (15)$$

By substituting equation (13) into equation (10), the following is obtained:

$$fa = \frac{(-fo) \cdot d4}{b} \quad (10')$$

In order that with fo<0 and fa>0 as the premise, the amount of decrease $\Delta$ in the space on the eyepiece side of the negative lens Lc according to the present invention may be smaller relative to the amount of displacement of the negative lens according to the prior art, b can be b>0 and for that purpose, it is necessary from equation (10') that d4>0. That is, in equation (15), it is necessary that the numerator of the right side be positive.

The condition for which the numerator of the right side of equation (15) is positive is a case where
(i) fe−d3<0 or
(ii) fe−d3≧0 and moreover 4fc(fo+fe−d3)>0.
fc<0 and from equation (12),
fo+fe=d1
and hence, in order that $$4fc(fo+fe-d3) = 4fc(d1-d3) > 0,$$

it is necessary that d1<d3.

That is, in order that the amount of displacement of the negative lens Lb according to the present invention may be smaller than the amount of displacement of the negative lens according to the prior art, d1 may be d1<d3.

Generally, d1 is also d2>d1 and therefore, a case where d2=d3, that is, the full length of the finder in the high magnification state and the full length of the finder in the low magnification state are the same, can be realized. Also, d2<d3 is possible and therefore, by providing the positive lens La projectedly on the front face of the finder, it is also possible to change the magnification to the high magnification. According to the system of the present invention, it is also possible to provide $$\beta 1 \geq 1$$

on the high magnification side, that is, to provide one-to-one magnification or enlargement. Further, the present invention has a positive lens as the objective lens in the high magnification state, and this is advantageous in correcting negative distortion which is liable to occur in the inverted Galilean finder.

In the foregoing description, the negative lens Lb as the objective lens for low magnification and the negative lens Lc in the objective lens for high magnification have been described as different lenses, but where, as previously described, the negative lens Lb for low magnification is used also as the negative lens for high magnification, fc=fb may be placed in the foregoing equations and of course, just the same construction can be realized. In such case, if the high magnification state of FIG. 5 according to the prior art is compared with the high magnification state of FIG. 7 according to the present invention, it will be clear that the amount of displacement of the negative lens in the direction of the optic axis for changing the magnification to the geomerically identical high magnification condition is reduced from the heretofore required (d2−d1) to d4.

In the foregoing description, the finder system has been described as a completely afocal optical arrangement, but with the actual finder, it is sometimes the case that the finder is not made into a completely afocal system but a predetermined visibility correction is applied. This visibility correction can of course be easily achieved by moving the eyepiece Le toward the object side or the observation side by an amount corresponding to the predetermined visibility.

The geometro-optical basic construction of the present invention has been described above in detail. Since the position of the principal point of the eyepiece or the objective lens is variable by the specific lens construction, the lens shape, the lens thickness, etc., the values of said d1, d2 and d3 are not always coincident with the full length of the finder. However, according to the above-described principle of the present invention, it is clear that as compared with the prior art, the amount of decrease in the space on the eyepiece side in the finder is smaller during the change of the magnification to the high magnification. With the finder of a camera, it is often the case that various optical members such as a half-mirror for providing an illuminating window type bright frame and a lens having a half-transmitting mirror surface for providing an Albada finder are added on the optic axis, but these members may be considered to be a part of the objective lens or the eyepiece.

Specific numerical values will now be shown as embodiments of the changeable magnification finder according to the present invention.

Figure 8:
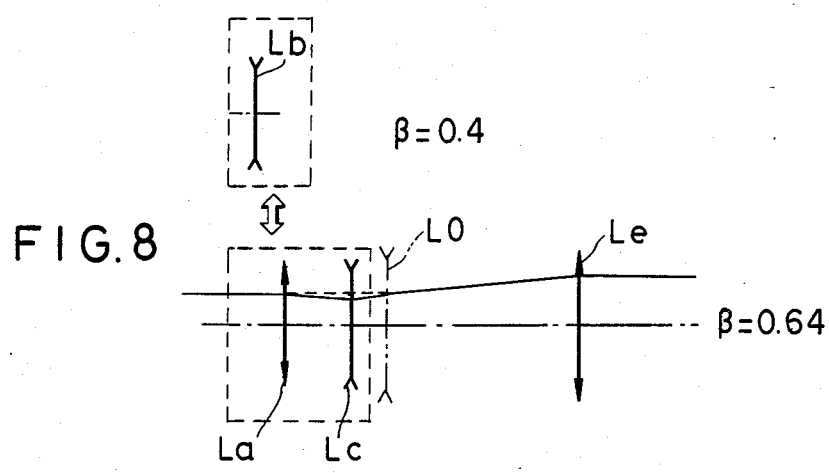
FIGS. 8, 9 and 10 show the constructions of first, second and third embodiments, respectively, of the present invention.
Figure 9:
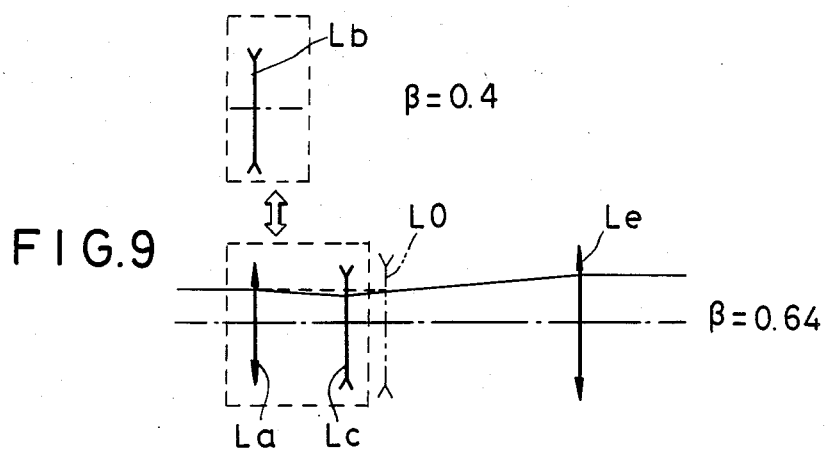
Figure 10:
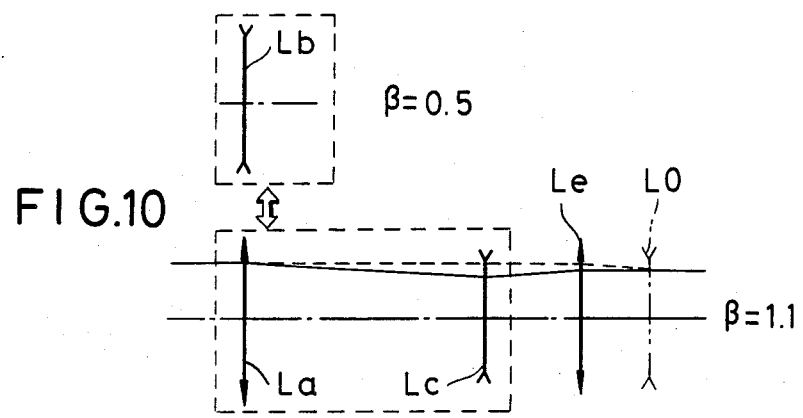

In first to third embodiments of the present invention, as shown in FIGS. 8 to 10, respectively, magnification change is accomplished by interchanging the negative lens Lb as the objective lens for low magnification with the positive lens La and the negative lens Lc as the objective lens for high magnification.

Figure 11:
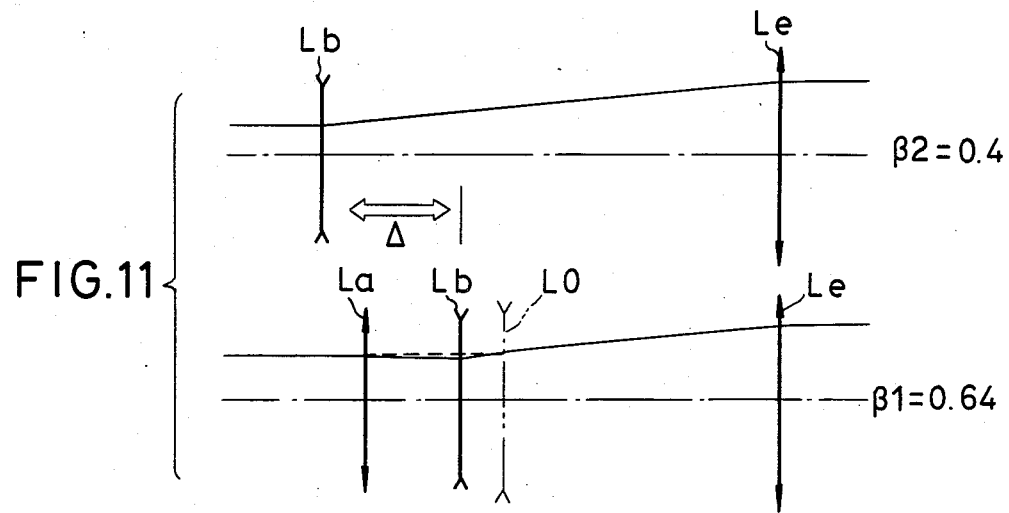
FIGS. 11, 12 and 13 show the constructions of fourth, fifth and sixth embodiments, respectively, of the present invention.
Figure 12:
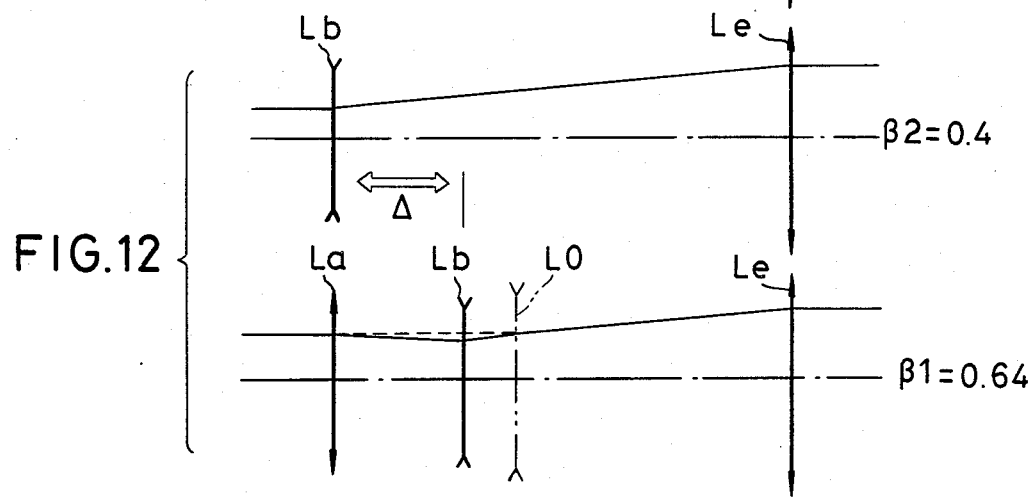
Figure 13:
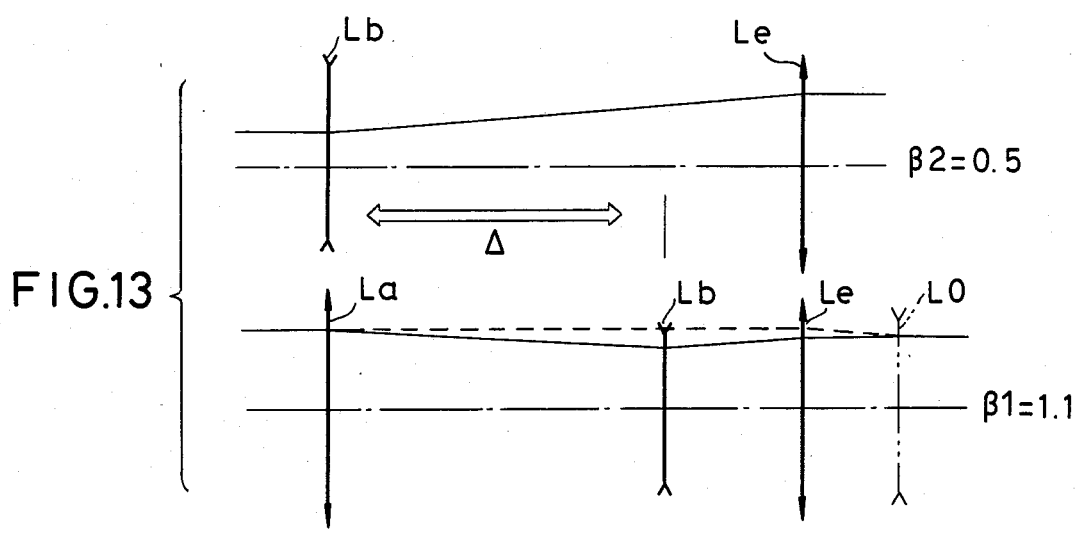

Also, fourth to sixth embodiments of the present invention, as shown in FIGS. 11 to 13, respectively, are ones in which the negative lens Lb as the objective lens for low magnification is used also as the negative lens in the objective lens for high magnification and, in these embodiments, the negative lens Lb is moved on the optic axis for magnification change and in the high magnification state, the positive lens La is inserted or added on the object side of this negative lens Lb.

The numerical data of the respective embodiments will be shown in the tables below and will be described.

In the tables below:
$\beta 1$: finder magnification in the high magnification state
$\beta 2$: finder magnification in the low magnification state d2: distance between the negative lens Lb as the objective lens in the low magnification state and the eyepiece Le d3: distance between the positive lens La forming the objective lens in the high magnification state and the eyepiece Le d4: distance between the positive lens La and the negative lens forming the objective lens for high magnification d1: distance between the negative lens Lo equivalent to the high magnification objective lens in the high magnification state (which lens Lo corresponds to the objective lens for high magnification in the prior art) and the eyepiece Le fa: focal length of the positive lens forming the objective lens for high magnification fb: focal length of the negative lens forming the objective lens for low magnification fc: focal length of the negative lens forming the objective lens for high magnification fe: focal length of the eyepiece fo: composite focal length of the objective lens for high magnification in the high magnification state a: distance between the object side focus of the eyepiece and the negative lens forming the objective lens for high magnification in the high magnification state b: distance between the negative lens Lo equivalent to the high magnification objective lens in the high magnification state (which lens Lo corresponds to the objective lens for high magnification in the prior art) and the negative lens forming the objective lens for high magnification

TABLE 1

(First Embodiment)
$d2 = 38.5, d3 = 35, \beta2 = 0.4x, (\beta1/\beta2) = 1.6$

| By equation (5), | fb = −25.667 |
| By equation (6), | fe = 64.167, $\beta1$ = 0.64 |
| By equation (1), | fo = −41.067 |
|  | fc = −30.0 |
| By equation (14), | a = 38.451 |
| By equation (15), | d4 = 9.284 |
| By equation (10), | fa = 145.744 |
| By equation (2), | d1 = 23.100 |
| By equation (13), | b = 2.616 |

The optical path of the first embodiment in the high magnification state is shown in FIG. 8. In the upper portion of this Figure, the objective lens Lb for low magnification is shown at an on-axis position to be interchanged. In this case, relative to the low magnification state, in the high magnification, the eyepiece side space decreases by Δ=12.784, but the eyepiece side space in the finder can be enlarged by 2.616 as compared with the magnification change by the conventional system, thereby accomplishing the magnification change to the high magnification.

TABLE 2

(Second Embodiment)
$d2 = d3 = 38.5, \beta2 = 0.4x, (\beta1/\beta2) = 1.6$

| By equation (5), | fb = −25.667 |
| By equation (6), | fe = 64.167, $\beta1$ = 0.64 |
| By equation (1), | fo = −41.067, |
|  | fc = fb = −25.667 |
| By equation (14), | a = 36.497 |
| By equation (15), | d4 = 10.830 |
| By equation (10), | fa = 97.321 |
| By equation (2), | d1 = 23.100 |

TABLE 2-continued (Second Embodiment)
$d2 = d3 = 38.5, \beta2 = 0.4x, (\beta1/\beta2) = 1.6$

| By equation (13), | b = 4.570 |

The optical path of the second embodiment in the high magnification state is shown in FIG. 9. In this case, relative to the low magnification state, in the high magnification state, the eyepiece side space decreases by Δ=10.830, but the eyepiece side space in the finder can be enlarged by 4.57 as compared with the magnification change by the conventional system, thereby accomplishing the magnification change to the high magnification. Thus, even if d2=d3, a changeable magnification finder can be realized as in the previous embodiment. If the full length on the low magnification side is the full length of the finder, it is desired that d3≦d2, but by equation (14), as the numerical value of d3 is greater, the value of becomes smaller and accordingly, by equation (13), the value of b becomes greater and therefore, when d2=d3, that is, in the high magnification state, the finder will become most compact if the positive lens is disposed at the same position as the objective lens in the low magnification state. Further, in the present embodiment, the focal length of the negative lens Lb as the objective lens for low magnification is equal to the focal length of the negative lens Lc forming the objective lens for high magnification and therefore, these lenses can be manufactured as a common lens and this is advantageous.

TABLE 3

(Third Embodiment)
$d2 = d3 = 40, \beta2 = 0.5x, (\beta1/\beta2) = 2.2$

| By equation (5), | fb = −40.0 |
| By equation (6), | fe = 80.0, $\beta1$ = 1.1 |
| By equation (1), | fo = −88.0 |
|  | fc = −30.0 |
| By equation (14), | a = 62.895 |
| By equation (15), | d4 = 22.895 |
| By equation (10), | fa = 80.253 |
| By equation (2), | d1 = −8.0 |
| By equation (13), | b = 25.105 |

The optical path of the third embodiment is schemically shown in FIG. 10. Again in this embodiment, d2=d3, but $\beta1$ is a considerably high magnification and moreover, the magnification ratio is as great as 2.2, and enlargement observation is possible in the high magnation state of $\beta1$=1.1. It should be noted that d1=−8.0 means that in the high magnification state of the conventional system, a negative lens having a focal length fo=−88.0 is further disposed on the observation side of the eyepiece, that is, this system is a Galelian type telephoto optical system. Thus, according to the present invention, telephoto observation becomes possible simply by interchanging the lens on the object side of the eyepiece.

TABLE 4

(Fourth Embodiment)
$d2 = 38.5, d3 = 35, \beta2 = 0.4x, (\beta1/\beta2) = 1.6$

| By equation (5), | fb = −25.667 |
| By equation (6), | fe = 64.167, $\beta1$ = 0.64 |
| By equation (1), | fo = −41.067 |
| By equation (14), | a = 37.346 |
| By equation (15), | d4 = 8.179 |
| By equation (10), | fa = 90.268 |

TABLE 4-continued (Fourth Embodiment)
d2 = 38.5, d3 = 35, β2 = 0.4x, (β1/β2) = 1.6

| By equation (2), | d1 = 23.100 |
|---|---|

The optical path of the fourth embodiment is schematically shown in FIG. 11. The upper portion of FIG. 11 shows the low magnification (wide angle) state, and the lower portion of FIG. 11 shows the high magnification (telephoto) state. In this case, by moving the negative lens Lb by Δ=11.679 and adding the positive lens La on the object side thereof, there is constructed an inverted Galelian finder which is capable of being changed over to the high magnification while decreasing the amount of displacement of the negative lens by 3.721 as compared with the magnification change by the conventional system.

TABLE 5

(Fifth Embodiment)
d2 = d3 = 38.5 β2 = 0.4x, (β1/β2) = 1.6

| By equation (5), | fb = −25.667 |
|---|---|
| By equation (6), | fe = 64.167, β1 = 0.64 |
| By equation (1), | fo = −41.067 |
| By equation (14), | a = 36.497 |
| By equation (15), | d4 = 10.830 |
| By equation (10), | fa = 97.321 |
| By equation (2), | d1 = 23.100 |
| By equation (13), | b = 4.570 |

The optical path of the second embodiment is schematically shown in FIG. 12. In this case, by moving the negative lens Lb by Δ=10.83 and adding the positive lens La on the objective side thereof, there is constructed an inverted Galilean finder which is capable of being changed over to the high magnification while decreasing the amount of displacement of the negative lens by 4.570 as compared with the magnification change by the conventional system. Thus, even if d2=d3, a changeable magnification finder can be realized as in the previous embodiment. If the full length on the low magnification side is the full length of the finder, it is desired that d3≦d2, but by equation (14), as the numerical value of d3 is greater, the value of a becomes smaller and accordingly, by equation (13), the value of b becomes greater and therefore, when d2=d3, that is, in the high magnification state, the finder will become most compact if the positive lens is disposed at the same position as the objective lens in the low magnification state.

TABLE 6

(Sixth Embodiment)
d2 = d3 = 40, β2 = 0.5x, (β1/β2) = 2.2

| By equation (5), | fb = −40.0 |
|---|---|
| By equation (6), | fe = 80.0, β1 = 1.1 |
| By equation (1), | fo = −88.0 |
| By equation (14), | a = 68.166 |
| By equation (15), | d4 = 28.166 |
| By equation (10), | fa = 124.968 |
| By equation (2), | d1 = −8.0 |
| By equation (13), | b = 19.834 |

The optical path of the third embodiment is schematically shown in FIG. 13. In this case, by moving the negative lens Lb by Δ=28.166 and adding the positive lens La on the object side thereof, there is constructed an inverted Galilean finder which is capable of being changed over to the high magnification while decreasing the amount of displacement of the negative lens by 19.834 as compared with the magnification change by the conventional system. Again in this embodiment, d2=d3, but β1 is a considerably high magnification and the magnification ratio (β1/β2) is as great as (β1/β2)=2.2, and enlargement observation is possible in the high magnification state of β1=1.1. It should be noted that d1=−8.0 means that in the high magnification state of the conventional system, the negative lens Lo having a focal length fo=−88.0 is further disposed on the observation side of the eyepiece, that is, the system is a Galelian type telephoto optical system. Thus, according to the present invention, the eyepiece is fixed and the lens is displaced and added on the object side thereof, whereby telephoto observation also becomes possible.

As is apparent from the foregoing specific examples of the numerical values, according to the present invention, there is realized a changeable magnification inverted Galilean finder having a structure which secures a larger eyepiece side space in the finder than in the prior art during magnification change and yet is compact and capable of simply changing over the magnification.

Also, according to the present invention, there is realized a changeable magnification inverted Galilean finder having a structure in which the amount of displacement of the negative lens in the direction of the optic axis is made considerably smaller than in the conventional system and yet which is compact and capable of simply changing over the magnification. Therefore, a sufficient space for containing optical members for effecting various displays can be secured in the field of view of the finder, and this leads to the provision of a changeable magnification inverted Galilean finder which is capable of effecting numerous information displays.

I claim:

1. A changeable magnification inverted Galilean finder having a low magnification state and a high magnification state, and providing a fixed large air space therein, comprising:

an eyepiece of positive refractive power; and an objective lens group having a negative refractive power comprising a first objective lens for low magnification and a second objective lens for high magnification, interchangeably disposed on the object side of said eyepiece, said first objective lens for low magnification including a first negative lens component having a predetermined negative refractive power, and forming with said eyepiece a substantially afocal optical system in the low magnification state, said second objective lens for high magnification including a second negative lens component and a positive lens component disposed on the object side of said second negative lens component, said positive lens component converging light rays from an object and said second negative lens component diverging the convergent light rays from said positive lens componenet, said positive lens component and said second negative lens component having a composite negative refractive power smaller than the refractive power of said first objective lens for low magnification, and forming with said eyepiece a substantially afocal system in the high magnification state, said first objective lens for low magnification being disposed on the same optical axis as that of said eyepiece in said a low magnification state, and said second objective lens for high magnification being disposed on the same optical axis as that of said eyepiece in said high magnification state, one of said low and high magnification states being selected by interchanging said first and second objective lenses, said large air space being provided between said objective lens group and said eyepiece even in the high magnification state.

2. A changeable magnification inverted Galilean finder according to claim 1, wherein the positive lens component and the second negative lens component forming said second objective lens for high magnification are provided integrally with each other and interchangeably with the first negative lens component forming said first objective lens for low magnification.

3. A changeable magnification inverted Galilean finder according to claim 2, wherein numerical data are as follows:

$d2=38.5$, $d3=35$, $\beta2=0.4x$, $(\beta1/\beta2)=1.6$
  $fb=-25.667$
  $fe=64.167$, $\beta1=0.64$
  $fo=-41.067$
  $fc=-30.0$
  $a=38.451$
  $d4=9.284$
  $fa=145.744$
  $d1=23.100$
  $b=2.616$ where $\beta1$: finder magnification in the high magnification state $\beta2$: finder magnification in the low magnification state d2: distance between the negative lens component as the objective lens in the low magnification state and the eyepiece d3: distance between the positive lens component forming the objective lens in the high magnification state and the eyepiece d4: distance between the positive lens component and the negative lens component forming the objective lens for high magnification d1: distance between the negative lens component equivalent to the high magnification objective lens in the high magnification state and the eyepiece fa: focal length of the positive lens component forming the objective lens for high magnification fb: focal length of the negative lens component forming the objective lens for low magnification fc: focal length of the negative lens component forming the objective lens for high magnification fe: focal length of the eyepiece fo: composite focal length of the objective lens for high magnification in the high magnification state a: distance between the object side focus of the eyepiece and the negative lens component forming the objective lens for high magnification in the high magnification state b: distance between the negative lens component equivalent to the high magnification objective lens in the high magnification state and the negative lens component forming the objective lens for high magnification.

4. A changeable magnification inverted Galileah finder according to claim 2, wherein numerical data are as follows:

$d2=d3=38.5$, $\beta2=0.4x$, $(\beta1/\beta2)=1.6$
  $fb=-25.667$
  $fe=64.167$, $\beta1=0.64$
  $fo=-41.067$
  $fc=fb=-25.667$
  $a=36.497$
  $d4=10.830$
  $fa=97.321$
  $d1=23.100$
  $b=4.570$ where $\beta1$: finder magnification in the high magnification state $\beta2$: finder magnification in the low magnification state d2: distance between the negative lens component as the objective lens in the low magnification state and the eyepiece d3: distance between the positive lens component forming the objective lens in the high magnification state and the eyepiece d4: distance between the positive lens and the negative lens component forming the objective lens for high magnification d1: distance between the negative lens component equivalent to the high magnification objective lens in the high magnification state and the eyepiece fa: focal length of the positive lens component forming the objective lens for high magnification fb: focal length of the negative lens component forming the objective lens for low magnification fc: focal length of the negative lens component forming the objective lens for high magnification fe: focal length of the eyepiece fo: composite focal length of the objective lens for high magnification in the high magnification state a: distance between the object side focus of the eyepiece and the negative lens component forming the objective lens for high magnification in the high magnification state b: distance between the negative lens component equivalent to the high magnification objective lens in the high magnification state and the negative lens component forming the objective lens for high magnification 5. A changeable magnification inverted Galilean finder according to claim 2, wherein numerical data are as follows:

$d2=d3=40$, $\beta2=0.5x$, $(\beta1/\beta2)=2.2$
  $fb=-40.0$
  $fe=80.0$, $\beta1=1.1$
  $fo=-88.0$
  $fc=-30.0$
  $a=\mathbf{62.895}$
  $d4=22.895$
  $fa=80.253$
  $d1=-8.0$
  $b=25.105$ where $\beta1$: finder magnification in the high magnification state $\beta2$: finder magnification in the low magnification state d2: distance between the negative lens component as the objective lens in the low magnification state and the eyepiece d3: distance between the positive lens component forming the objective lens in the high magnification state and the eyepiece d4: distance between the positive lens component and the negative lens component forming the objective lens for high magnification d1: distance between the negative lens component equivalent to the high magnification objective lens in the high magnification state and the eyepiece fa: focal length of the positive lens component forming the objective lens for high magnification fb : focal length of the negative lens component forming the objective lens for low magnification fc: focal length of the negative lens component forming the objective lens for high magnification fe: focal length of the eyepiece fo: composite focal length of the objective lens for high magnification in the high magnification state a: distance between the object side focus of the eyepiece and the negative lens component forming the objective lens for high magnification in the high magnification state b: distance between the negative lens component equivalent to the high magnification objective lens in the high magnification state and the negative lens component forming the objective lens for high magnification.

6. A changeable magnification inverted Galilean finder having a low magnification state and a high magnification state, and providing a fixed large air space therein, comprising:

an eyepiece of positive refractive power; and an objective lens group comprising a negative lens component for low magnification and for high magnification disposed on the object side of said eyepiece coaxially therewith, and a positive lens component for high magnification, said negative lens component having a predetermined negative refractive power and forming with said eyepiece a substantially afocal optical system in the low magnification state, said negative lens component, in the high magnification state, being disposed at a position nearer to said eyepiece than the position of said negative lens component in the low magnification state, said positive lens component for high magnification being disposed coaxially with said eyepiece on the object side of said negative lens component in the high magnification state, said positive lens component converging light rays from an object and said negative lens component diverging the convergent light rays from said positive lens component, said positive lens component and said negative lens component having a composite negative refractive power smaller than the refractive power of said negative lens component and forming with said eyepiece a substantially afocal system in the high magnification state, said large air space being provided between said negative lens component and said eyepiece even in the high magnification state.

7. A changeable magnification inverted Galilean finder according to claim 6, wherein numerical data are as follows:

d2=38.5, d3=35, $\beta2$=0.4x, $(\beta1/\beta2)$=1.6 fb= −25.667
fe=64.167, $\beta1$=0.64
fo= −41.067
a=37.346
d4=8.179
fa=90.268
d1=23.100 where $\beta1$: finder magnification in the high magnification state $\beta2$: finder magnification in the low magnification state d2: distance between the negative lens component as the objective lens in the low magnification state and the eyepiece d3: distance between the positive lens component forming the objective lens in the high magnification state and the eyepiece d4: distance between the positive lens component and the negative lens component forming the objective lens for high magnification d1: distance between the negative lens component equivalent to the high magnification objective lens in the high magnification state and the eyepiece fa: focal length of the positive lens component forming the objective lens for high magnification fb: focal length of the negative lens component forming the objective lens for low magnification fc: focal length of the negative lens component forming the objective lens for high magnification fe: focal length of the eyepiece fo: composite focal length of the objective lens for high magnification in the high magnification state a: distance between the object side focus of the eyepiece and the negative lens component forming the objective lens for high magnification in the high magnification state b: distance between the negative lens component equivalent to the high magnification objective lens in the high magnification state and the negative lens component forming the objective lens for high magnification.

8. A changeable magnification inverted Galilean finder according to claim 6, wherein the position on the optic axis in the high magnification state of the positive lens component forming said objective lens for high magnification is equal to the position on the optic axis in the low magnification state of the negative lens component forming said objective lens for low magnification.

9. A changeable magnification inverted Galilean finder according to claim 8, wherein numerical data are as follows:

d2=d3=38.5, $\beta2$=0.4x, $(\beta1/\beta2)$=1.6
fb= −25.667
fe=64.167, $\beta1$=0.64
fo= −41.067
a=36.497
d4=10.830
fa=97.321
d1=23.100
b=4.570 where $\beta1$: finder magnification in the high magnification state $\beta2$: finder magnification in the low magnification state d2: distance between the negative lens component as the objective lens in the low magnification and the eyepiece d3: distance between the positive lens component forming the objective lens in the high magnification state and the eyepiece d4: distance between the positive lens component and the negative lens component forming the objective lens for high magnification d1: distance between the negative lens component equivalent to the high magnification objective lens in the high magnification state and the eyepiece fa: focal length of the positive lens component forming the objective lens for high magnification fb: focal length of the negative lens component forming the objective lens for low magnification fc: focal length of the negative lens component forming the objective lens for high magnification fe: focal length of the eyepiece fo: composite focal length of the objective lens for high magnification in the high magnification state a: distance between the object side focus of the eyepiece and the negative lens component forming the objective lens for high magnification in the high magnification state b: distance between the negative lens component equivalent to the high magnification objective lens in the high magnification state and the negative lens component forming the objective lens for high magnification.

10. A changeable magnification inverted Galilean finder according to claim 8, wherein numerical data are as follows:

$d2 = d3 = 40$, $\beta 2 = 0.5x$, $(\beta 1/\beta 2) = 2.2$
$fb = -40.0$
$fe = 80.0$, $\beta 1 = 1.1$
$fo = -88.0$
$a = 68.166$
$d4 = 28.166$
$fa = 124.968$
$d1 = -8.0$
$b = 19.834$ where $\beta 1$: finder magnification in the high magnification state $\beta 2$: finder magnification in the low magnification state d2: distance between the negative lens component as the objective lens in the low magnification state and the eyepiece d3: distance between the positive lens component forming the objective lens in the high magnification state and the eyepiece d4: distance between the positive lens component and the negative lens component forming the objective lens for high magnification d1: distance between the negative lens component equivalent to the high magnification objective lens in the high magnification state and the eyepiece fa: focal length of the positive lens component forming the objective lens for high magnification fb: focal length of the negative lens component forming the objective lens for low magnification fc: focal length of the negative lens component forming the objective lens for high magnification fe: focal length of the eyepiece fo: composite focal length of the objective lens for high magnification in the high magnification state a: distance between the object side focus of the eyepiece and the negative lens component forming the objective lens for high magnification in the high magnification state b: distance between the negative lens component equivalent to the high magnification objective lens in the high magnification state and the negative lens component forming the objective lens for high magnification.

11. A changeable magnification inverted Galilean finder including in succession from the object side:

an objective lens group having a negative refractive power; and an eyepiece of positive refractive power disposed at a predetermined distance from said objective lens group;

said objective lens group being disposed at the object side of said eyepiece and comprising a first objective lens for low magnification and a second objective lens for high magnification, said first objective lens for low magnification including a first negative lens component having a predetermined negative refractive power, and forming with said eyepiece a substantially afocal optical system, said second objective lens for high magnification including a second negative lens component and a positive lens component disposed on the object side of said second negative lens component, said positive lens component converging light rays from an object and said second negative lens component diverging the convergent light rays from said positive lens component, said second objective lens including said second negative lens component and said positive lens component having a composite negative refractive power smaller than the refractive power of said first objective lens for low magnification, said first objective lens for low magnification being disposed on the same optical axis as that of said eyepiece in said low magnification state and said second objective lens for high magnification being disposed on the same optical axis as that of said eyepiece in said high magnification state, one of said low and high magnification states being selected by interchanging said first and second objective lenses, a large air space being provided between said objective lens group and said eyepiece even in the high magnification state.

* * * * *